(12) United States Patent
Berkan et al.

(10) Patent No.: US 10,710,882 B2
(45) Date of Patent: Jul. 14, 2020

(54) PURIFICATION PROCESS MODELED FOR SHAPE MODIFIED NATURAL GRAPHITE PARTICLES

(71) Applicant: Syrah Resources Ltd., Melbourne (AU)

(72) Inventors: Jens Berkan, St. Kilda (AU); Joseph Williams, Brighton (AU); Peter Barnes, Cottesloe (AU); Tah Nean Chan, Bullcreek (AU)

(73) Assignee: Syrah Resources Ltd., Melbourne (AU)

(*) Notice: Subject to any disclaimer, the term of this patent is extended or adjusted under 35 U.S.C. 154(b) by 531 days.

(21) Appl. No.: 15/631,856

(22) Filed: Jun. 23, 2017

(65) Prior Publication Data
US 2017/0369321 A1  Dec. 28, 2017

Related U.S. Application Data

(60) Provisional application No. 62/365,785, filed on Jul. 22, 2016, provisional application No. 62/355,195, filed on Jun. 27, 2016.

(51) Int. Cl.
*C01B 32/21* (2017.01)
*C01B 32/225* (2017.01)
*C01B 32/215* (2017.01)

(52) U.S. Cl.
CPC .......... *C01B 32/21* (2017.08); *C01B 32/215* (2017.08); *C01B 32/225* (2017.08)

(58) Field of Classification Search
CPC ...... C01B 32/21; C01B 32/215; C01B 32/225
See application file for complete search history.

(56) References Cited

U.S. PATENT DOCUMENTS

| | | | |
|---|---|---|---|
| 4,780,112 A | 10/1988 | Lloyd | |
| 5,756,062 A | 5/1998 | Greinke et al. | |
| 6,139,990 A * | 10/2000 | Kubota | C09C 1/56 429/231.8 |
| 6,344,296 B1 | 2/2002 | Ishii | |
| 6,403,259 B1 | 6/2002 | Kitagawa | |
| 6,576,369 B1 | 6/2003 | Moriguchi et al. | |
| 6,723,471 B2 | 4/2004 | Kitagawa | |
| 6,764,767 B2 | 7/2004 | Moriguchi | |
| 6,884,545 B2 | 4/2005 | Fukuda | |
| 6,939,526 B2 | 9/2005 | Fukuda | |
| 7,485,395 B2 | 2/2009 | Kim | |
| 7,993,621 B2 | 8/2011 | Zaghib | |
| 8,431,270 B2 | 4/2013 | Matsumoto | |
| 8,753,778 B2 | 6/2014 | Lee | |

(Continued)

OTHER PUBLICATIONS

Definition of coupled, accessed online at https://www.merriam-webster.com/dictionary/coupled on Jan. 4, 2020. (Year: 2020).*

*Primary Examiner* — Daniel C. McCracken
(74) *Attorney, Agent, or Firm* — Kilpatrick Townsend & Stockton LLP

(57) ABSTRACT

Embodiments of the invention are directed to systems and methods for purifying graphite particles. Graphite flakes can be milled, and then separated into groups with different nominal sizes. The different groups of particles are purified according to optimized purification processes. Groups of purified particles with narrow size distributions are created using embodiments of the invention.

19 Claims, 14 Drawing Sheets

(56) References Cited

U.S. PATENT DOCUMENTS

| | | |
|---|---|---|
| 8,993,170 B2 | 3/2015 | Yue |
| 2001/0051300 A1 | 12/2001 | Moriguchi |
| 2003/0152835 A1 | 8/2003 | Dasgupta |
| 2004/0137328 A1 | 7/2004 | Kim |
| 2004/0151837 A1 | 8/2004 | Morita et al. |
| 2004/0227264 A1 | 11/2004 | Zou |
| 2005/0207966 A1* | 9/2005 | Zaghib .............. H01M 4/133 423/448 |
| 2006/0062716 A1 | 3/2006 | Zaghib |
| 2006/0133980 A1 | 6/2006 | Nanba et al. |
| 2007/0194158 A1 | 8/2007 | Zaghib |
| 2008/0044656 A1 | 2/2008 | Ko |
| 2009/0136849 A1 | 5/2009 | Yue |
| 2009/0311599 A1 | 12/2009 | Kawai |
| 2012/0148922 A1 | 6/2012 | Takahashi |
| 2013/0040203 A1 | 2/2013 | Yoon |
| 2013/0130117 A1 | 5/2013 | Yamamoto |
| 2013/0252031 A1 | 9/2013 | Ma |
| 2013/0309578 A1 | 11/2013 | Umeno |
| 2014/0045060 A1 | 2/2014 | Park |
| 2014/0050984 A1 | 2/2014 | Park |
| 2014/0065488 A1 | 3/2014 | Lee |
| 2014/0093781 A1 | 4/2014 | Nishihara et al. |
| 2014/0178762 A1 | 6/2014 | Lee |
| 2014/0212750 A1 | 7/2014 | Ahn |
| 2014/0227588 A1 | 8/2014 | Kim |
| 2014/0356707 A1 | 12/2014 | Kwon |

\* cited by examiner

PURIFICATION PROCESS MODELED FOR SHAPE MODIFIED NATURAL GRAPHITE PARTICLES

CROSS-REFERENCES TO RELATED APPLICATIONS

This application is a non-provisional of and claims the benefit of U.S. Patent Application No. 62/365,785, filed on Jul. 22, 2016, and 62/355,195, filed on Jun. 27, 2016, which were herein incorporated by reference in their entirety for all purposes.

BRIEF SUMMARY

Secondary battery systems such as rechargeable lithium ion systems, contain an anode and a cathode. Within such systems, carbon based materials are commonly used as the active material of the anode. Their application within battery systems is ideal due to the material's excellent thermal stability and electrical conductivity along graphite basal planes. Additionally, in the case of lithium ion systems, the interstitial space between carbon sheets comprising the graphite is conveniently sized to allow lithium ions to travel and bind within.

Due to the specificity of product requirements inside battery components, primarily driven by safety and reliability concerns, the purity of components comprising battery materials must be very high. Purified graphite, natural or synthetic, is used as a battery component.

Synthetic graphite is derived from refinery or coal baking residues and can be costly to produce, while natural graphite is mined from various sites globally and as such contains a wider variety of contaminants. Natural graphite is the most stable form of carbon at the earth's surface. The mineral is concentrated naturally in three distinct styles of geologic deposit comprising different material specifications. The three styles are:

1. Disseminated amorphous natural graphite—typified by high volume and low grade, low crystallinity, small particle size and a turbostratic structure.
2. Bedded flake graphite—medium to high volume, medium to high grade, moderate to highly crystalline, small to large particle size and a largely hexagonal form.
3. Vein style graphite—low volume, very high grade, and highly crystalline, the largest particle size of hexagonal form, but it only occurs in small quantities requiring labor intensive extraction.

To qualify for use in most applications, natural graphite preferably has a high purity with less than 5% gangue minerals bound in concentrate, which is derived from the ore. The same is true for synthetic graphite and other graphite-like carbon materials intended for industrial application. Typically graphite ore, once excavated, passes through a series of flotation units to concentrate graphite material. This is then subjected to downstream processing and purification to meet product specification requirements.

The origin of natural graphite is primarily organic and therefore is typically found within geologies comprising reductive chemistries. Fluids flowing through these areas often precipitate and concentrate minerals. These minerals are generally considered deleterious within a graphite deposit. The variation and abundance of deleterious minerals existing within the geology has considerable implication on the economics of mine development (particularly on the metallurgical process of producing highly pure material).

Disseminated high grade natural graphite is generally found in flake form with various size and shape fractions. The typical flake greatly varies in size and shape and in purity. Naturally flake graphite contains microscopic and macroscopic impurities comprising various minerals, partially embedded in the flake structure and partially bonded to the flakes, or agglomerated on the flakes' exterior. Minerals often resembling typical flake impurities include, but are not limited to silica, feldspar, calcite, micas, or sulfides.

For various reasons, for applications in primary or secondary batteries, natural graphite is generally altered to more spherical shapes. This processing, for instance, will smooth the material to improve conductivity in all directions, reduce the surface area to volume, etc. This modification utilizes mechanical processing. During this processing, material losses and cross contamination occurs between the processing equipment and the graphite due to wear and tear. Therefore, graphite products are typically purified after the shaping process that produces spherical graphite, rather than purification of the flake before the shaping process.

To remove the complex mineral based contaminants from the graphite particle spherules, acid or caustic leaching processes, or a combination of these, are applied during which the impurities are dissolved and eventually removed by diffusion and dilution from the graphite material.

The progression of these chemical leaching processes depends on many physical parameters and can be precisely controlled. Such parameters may include chemical concentrations, solution agitation, temperatures, and time. Others, such as the quality and quantity of the physically active surface of the graphite particles in terms of diffusion pathways, the "chemically attackable" surface, and the location and distribution of the particle-embedded impurities, are product specific properties that respond to chemical concentrations and reactions and intrinsic chemical diffusion resistances.

Embodiments of the invention are directed to systems and methods for improved graphite purification processing.

One embodiment of the invention is directed to a method comprising: performing a pre-purification process on raw graphite flakes; milling the pre-purified graphite flakes to form graphite particles of different sizes; classifying the groups of graphite particles according to different nominal sizes; and performing different purification processes for the different groups of graphite particles.

Another embodiment of the invention is directed to a system comprising: a milling apparatus for milling graphite flakes into graphite particles; a classification apparatus coupled to the milling apparatus for classifying the graphite particles into different particle groups with different nominal sizes; a plurality of shaping apparatuses for shaping the graphite particles in the different particle groups; and a plurality of purification apparatuses respectively coupled to the plurality of shaping apparatuses.

These and other embodiments of the invention are described in further detail below.

DETAILED DESCRIPTION

Graphite particles, preferably of natural origin, are produced or processed into spherical or quasi-spherical form, and are subsequently chemically purified in solution. The solution can contain either an acidic or caustic substance to chemically leach the mineral contaminants from the graphite by dissolving and removing deleterious material from the graphite particle product.

The process of chemical graphite particle material leaching uses a chemically active solution, in relation to the impurities that are intended to be removed from the graphite, as well as a significantly less chemically active solution in direct relation to the graphite. The physical characteristics of the chemically active solution include wetting and permeating the graphite particles by means of capillary effects as well as diffusion based on chemical concentration gradients.

The active solution chemically reacts with the gangue minerals and other impurities by forming soluble chemical products that remain dissolved in liquid phase in the chemically active solution and diffuse from the graphite body into the solution by means of natural diffusion and agitated bath movement.

Assuming average, homogenous, mechanical-physical properties of the structural matrix of the graphite particles, the diffusion is primarily governed by the particle specific diffusion resistances for the different chemicals of minerals, acids, and salts and their concentration gradients throughout the solution (according to Fick's laws) and across the leaching pathways within the graphite particles. This results in an exponential function describing the concentrations at any reference point across the leaching pathways within the graphite particles as a function of material properties, location concentrations, time and temperatures.

Real spherical graphite particles vary in shape roundness, smoothness and diameter. Typically, ovality factors of 0.7 or less can be encountered, and diameters can vary between some 5 μm and 60 μm, or beyond.

Figure 1:
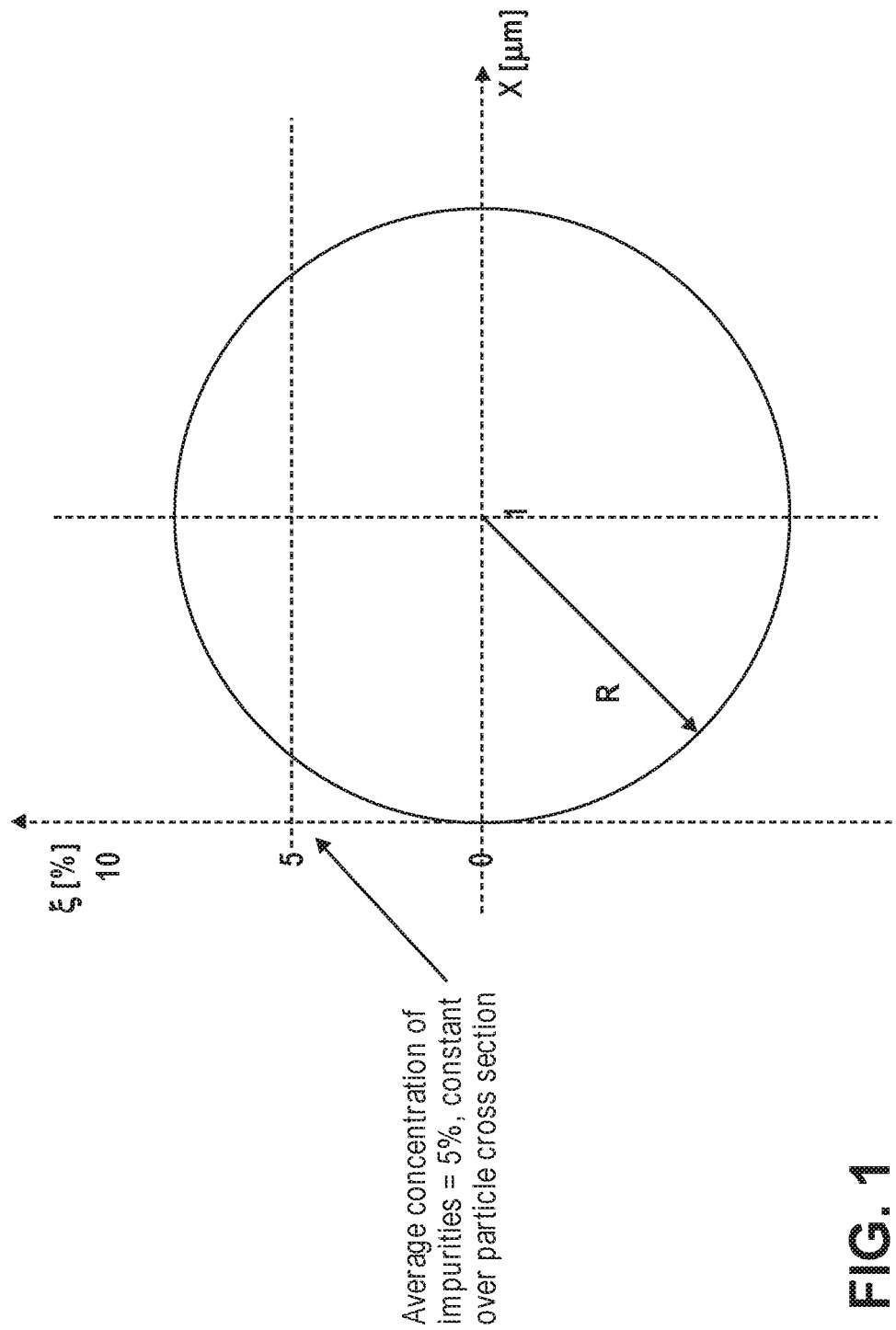
FIG. 1 shows a diagram of a normalized graphite particle with an averaged impurity concentration.

FIG. 1 shows an example, of a cut illustration of an ideal spherical graphite particle with the roundness of 1 and a normalized size to the radius of R=1, made of un-purified graphite. The ideal spherical graphite particle has an average constant concentration of impurities of $\xi_{(mineral)}=5\%$, as could typically exist prior to chemical purification and after spheroidisation.

If this particle is exposed to a chemical active agent as described above, a chemical reaction between the dissolved chemicals, i.e. acids, and the particle-intrinsic impurities will occur, eventually resulting in a reduction of remaining impurities at the location of the chemical reaction. As described above, the process of intrusion of the chemical active substances into the particle, the occurring chemical reactions and the resulting concentration difference driven diffusion processes are exponential functions of the location along the radius from the outer surface into the center of the particle, and time.

Figure 2:
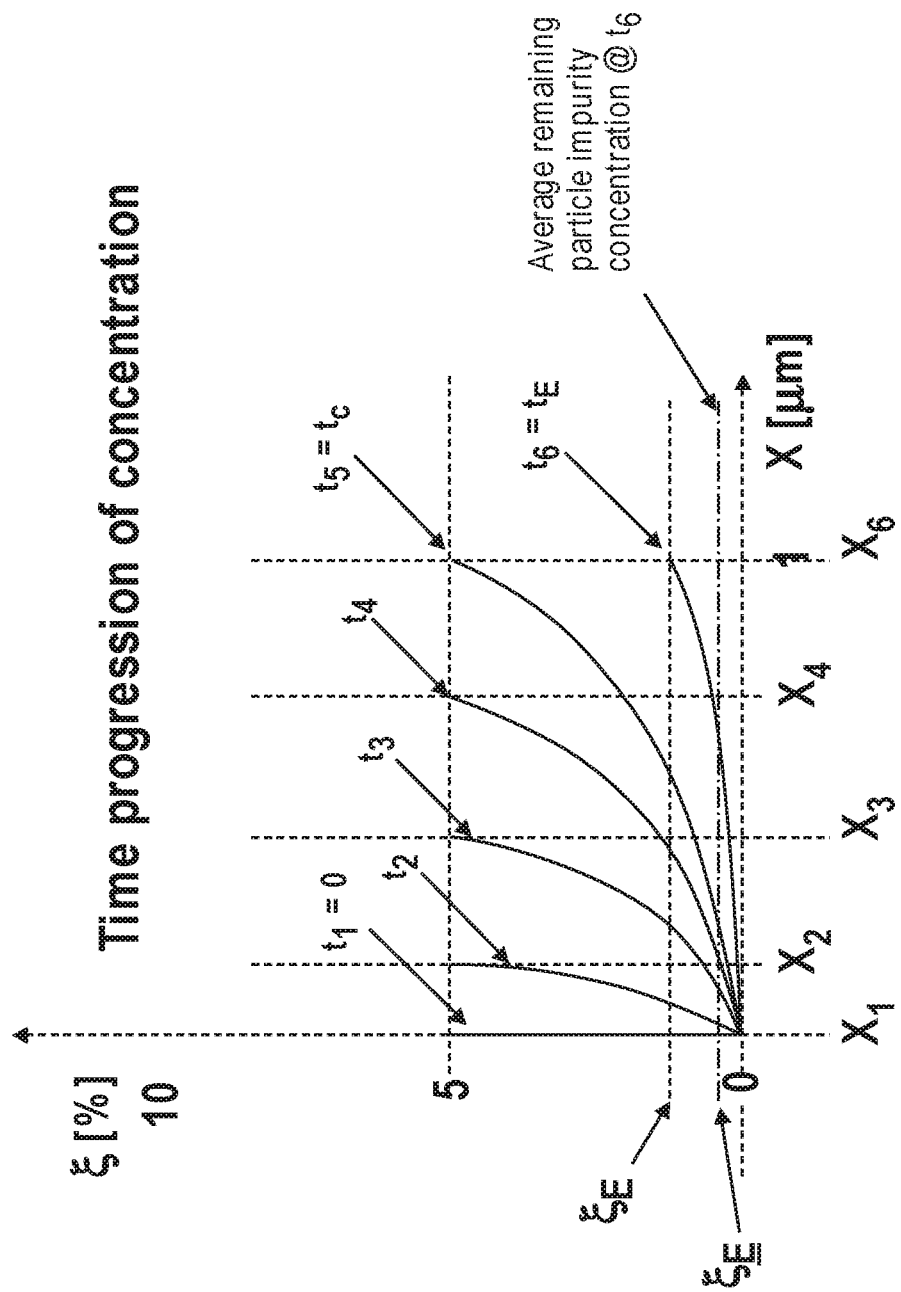
FIG. 2 shows a graph showing a progression of the chemical reactions and diffusion.

FIG. 2 illustrates the progression of the chemical reactions and diffusion processes along the radial axis of the graphite particle of FIG. 1, as a function of time, represented by the locally experienced reduction in remaining impurity concentration. Leaching begins at the first moment when the particle is immersed into the chemical leaching bath, and the particle surface is exposed to the chemical leaching bath. At this early moment of $t_1$, the impurity concentration within the particle remains constant at the original level throughout the entire cross section, with the exception of the surface, marked by the position $X_1$. The process involves diffusion of leaching chemicals from the solution into the particle, the chemical reaction between the active leaching chemicals and the impurities, and the diffusion of the chemical reaction products out of the particle into the solution.

As the process is driven by concentration gradients over time and distance, the physical and chemical process can be described by exponential functions. At the time $t_2$, the reduction in impurity concentration has exponentially progressed to the location $X_2$ along the radius, and so on, with the remaining unaffected zone (R-X) diminishing with progressing time until at the time $t_5$ the progression of chemical reactions and physical diffusion processes has reached the very core of the particle with (R-X)=0.

From this moment, impurity concentrations at the center of the particle are exponentially reduced and continuously progress over the entire cross section of the particle. This process progresses until a critical end concentration $\xi_{(core)}=\xi_E$ is achieved in the core. This corresponds to the final target average purity of the product, expressed as averaged over the exponential concentration distribution throughout the entire particle.

Any leaching beyond this time will result in an over-purification, and thus in a waste of resources. Any leaching below this time will result in an under-purification and thus in a rejected product that does not meet purification requirements.

Therefore, for an ideal particle with an ideal nominal radius, or nominal diameter $D_N$, the ideal leaching parameters, especially, the ideal nominal leaching time can be precisely established. In analogy, for a given ideal nominal leaching time, any particle smaller than $D_N$ will be over-purified, and any particle larger than $D_N$ will be under-purified.

Figure 3:
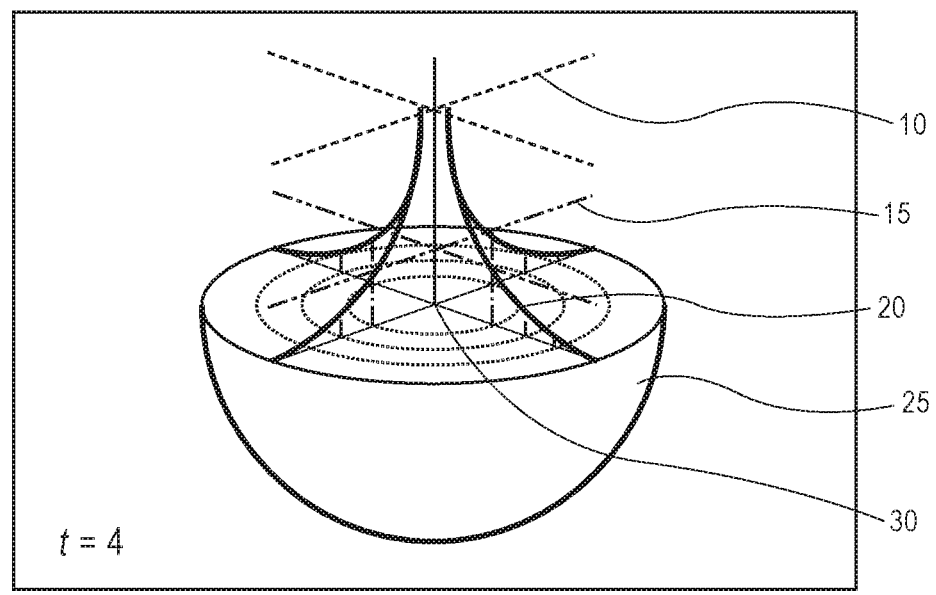
FIG. 3 shows a particle intrinsic concentration of contaminants after leaching, at t=4

FIG. 3 shows the distribution of contaminants within a particle after leaching, at t=4, whereby the surface of the particle has a high degree of purity. However, the core is relatively contaminated and has not been altered by the leaching treatment.

In the model illustrated in FIG. 3, 10 is the initial average purity (maximum contamination), 15 is the current average purity (at t=4), 20 is the contaminants curve, 25 is the particle surface ($r_{max}$), and 30 is the particle center (r=0).

Figure 4:
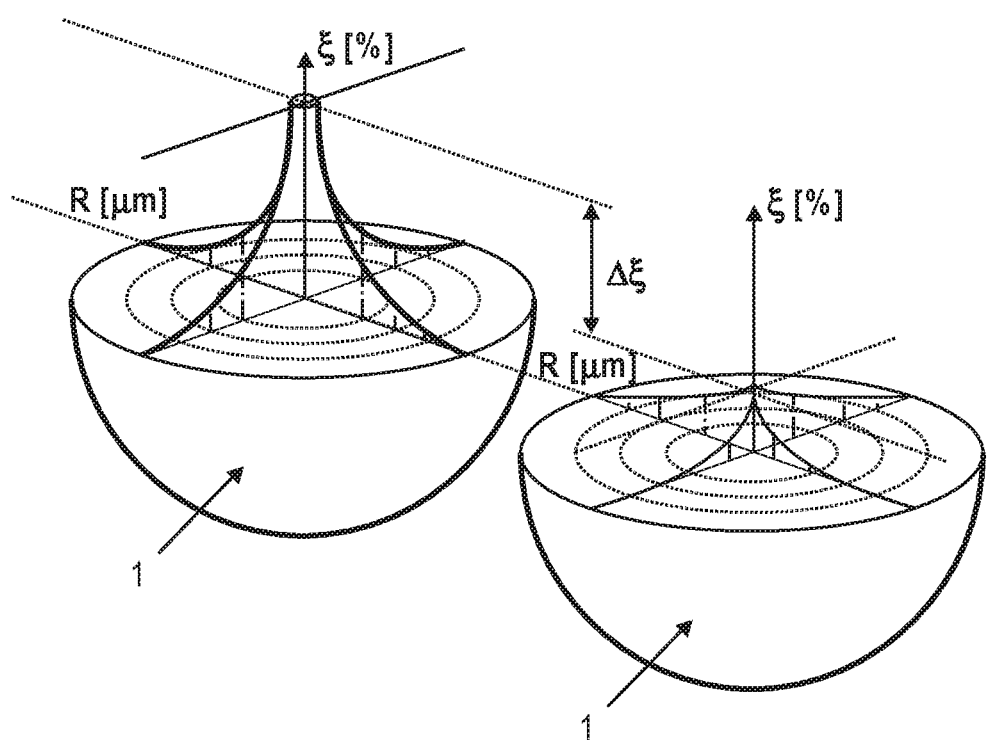
FIG. 4 shows a distribution of contaminants in the same size particle 1 (on left) after leaching, at t=4, and t=6 (on right).

FIG. 4 shows the distribution of contaminants within two particles of the same size 1 after leaching, at t=4, and after extended leaching time of t=6. At t=6 the leaching treatment has already significantly progressed into the core of the particle and has reduced the core impurity as well, to the degree that the required average contamination meets the specified requirements.

Figure 5:
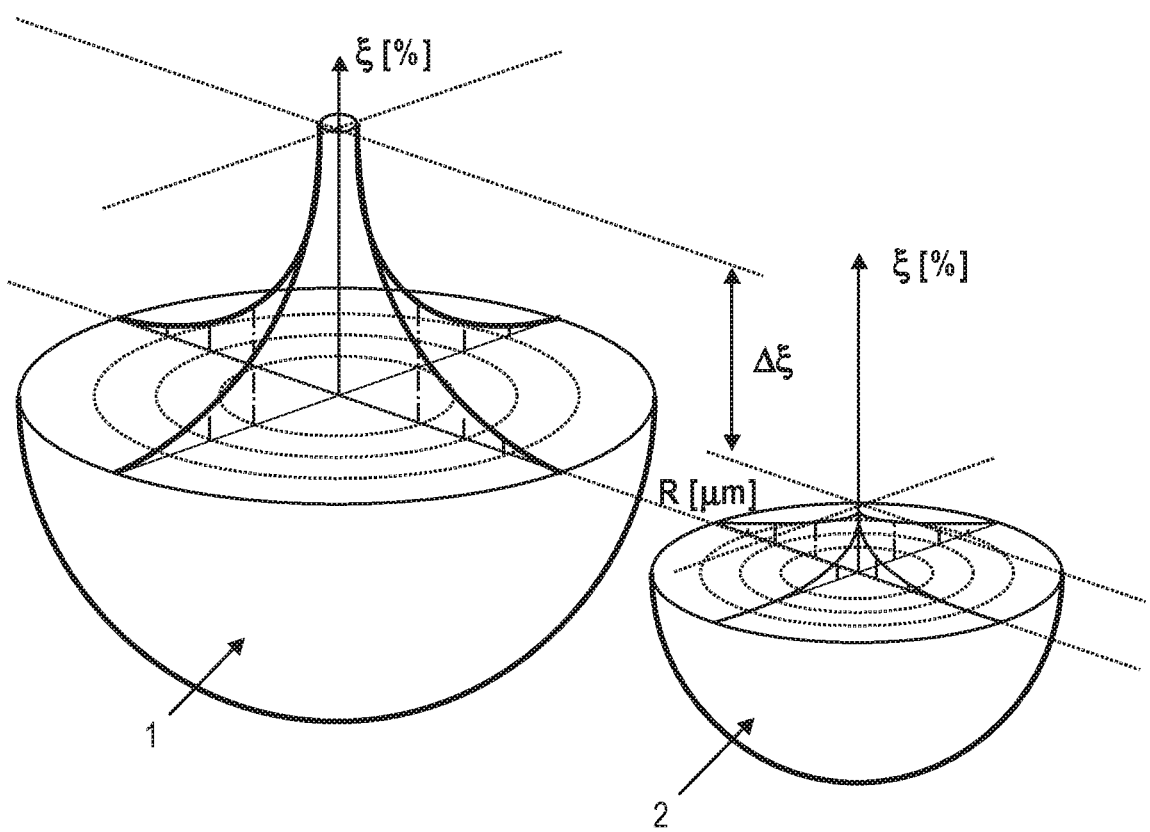
FIG. 5 shows a distribution of contaminants in two different size particles 1, 2 after leaching at t=4.

FIG. 5 shows the distribution of contaminants for the constant leaching time of t=4 comparing the same particle 1 with a smaller particle 2, whereby the leaching treatment has already progressed into the core of the smaller particle 2 and has reduced the core impurity as well.

Figure 6:
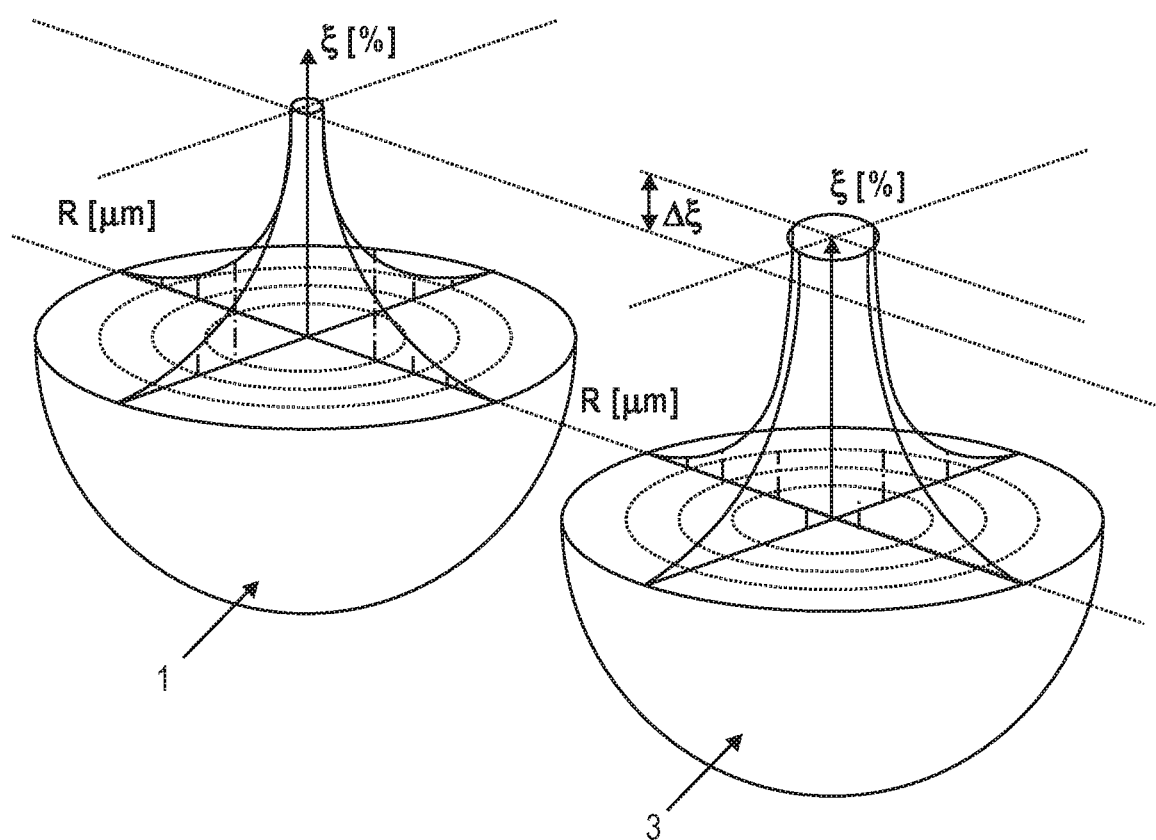
FIG. 6 shows a distribution of contaminants in the same size particle with the starting impurity of particle 1 being less than particle 3.

FIG. 6 shows the distribution of contaminants within the same size particle 1 after leaching, at t=4, and different starting impurities, whereby particle 3 has higher starting impurity than particle 1 and the leaching time is too short to impact the core of the particle.

The spherical battery anode material is a product with a particle size distribution based on a nominal particle size $D_N$, and a standard deviation SD, and typically specified by the 3 parameters $D_{10}$, $D_N$, $D_{90}$. $D_{10}$ is the diameter at which 10% of a sample's mass is comprised of smaller particles. $D_{90}$ is the diameter at which 90% of the sample's mass is comprised of smaller particles.

Figure 7:
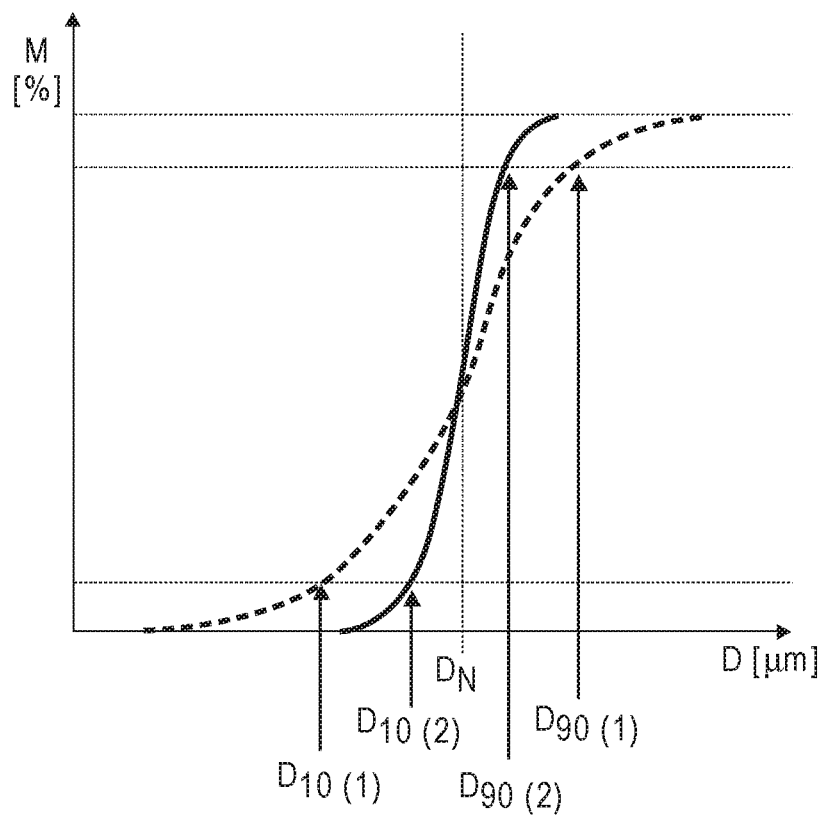
FIG. 7 shows a graph showing different products for an identical $D_N$, with two different standard deviations and therefore two different $D_{10}$ and $D_{90}$.

FIG. 7 shows two different products for an identical $D_N$, with two different standard deviations and therefore two different $D_{10}$ and $D_{90}$. Product (1) has a wider standard deviation than product (2).

Figure 8:
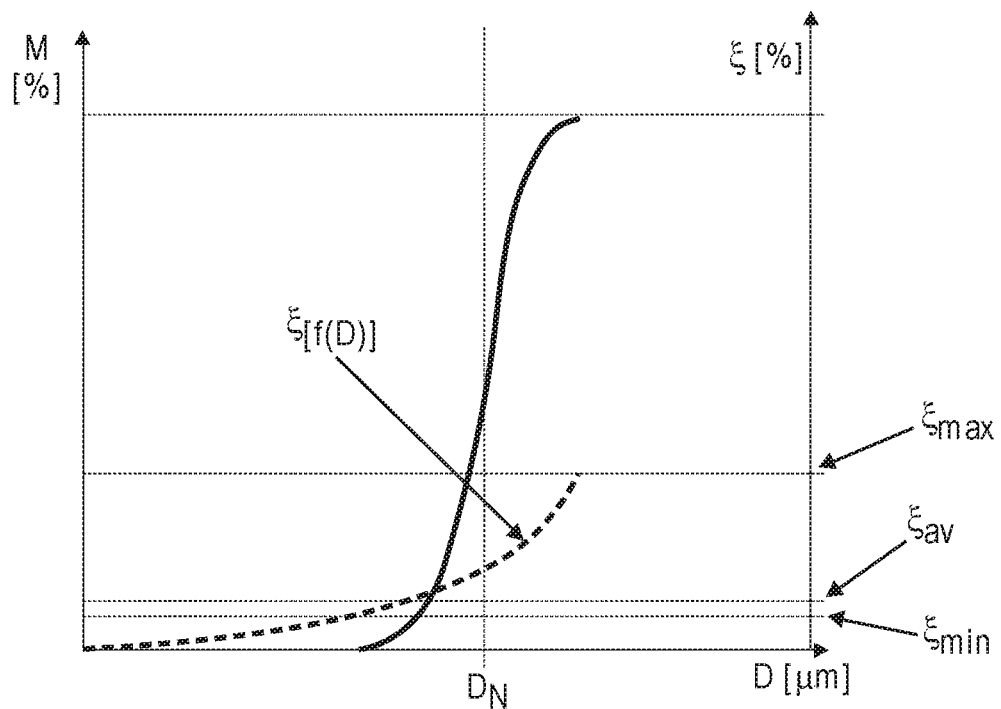
FIG. 8 shows a graph illustrating particle purity for constant leaching time and constant initial contamination as a function of particle diameter.

According to the above, for a given specific leaching processing time t, the smaller diameter particles have reached a higher degree of purity than the larger diameter particles, as shown in FIG. 8.

Optimized chemical purification can use leaching parameters such as:

a homogenous impurity distribution throughout each single particle;

structural consistency across different particles of a given distribution; and individual uniformity of particle size and shapes It can be reasonably assumed that, in any industrial application, for most of any industrial single source feedstock raw material (i.e. flake graphite), the particle-intrinsic impurity distribution is quasi-homogenous. However, the total impurity concentration may vary depending on particle sizes (i.e. larger graphite flakes may or may not contain more impurities than smaller flakes). Also, any industrial product is represented by a distribution of different sized particles rather than a single-sized homogenous particle size.

Figure 9:
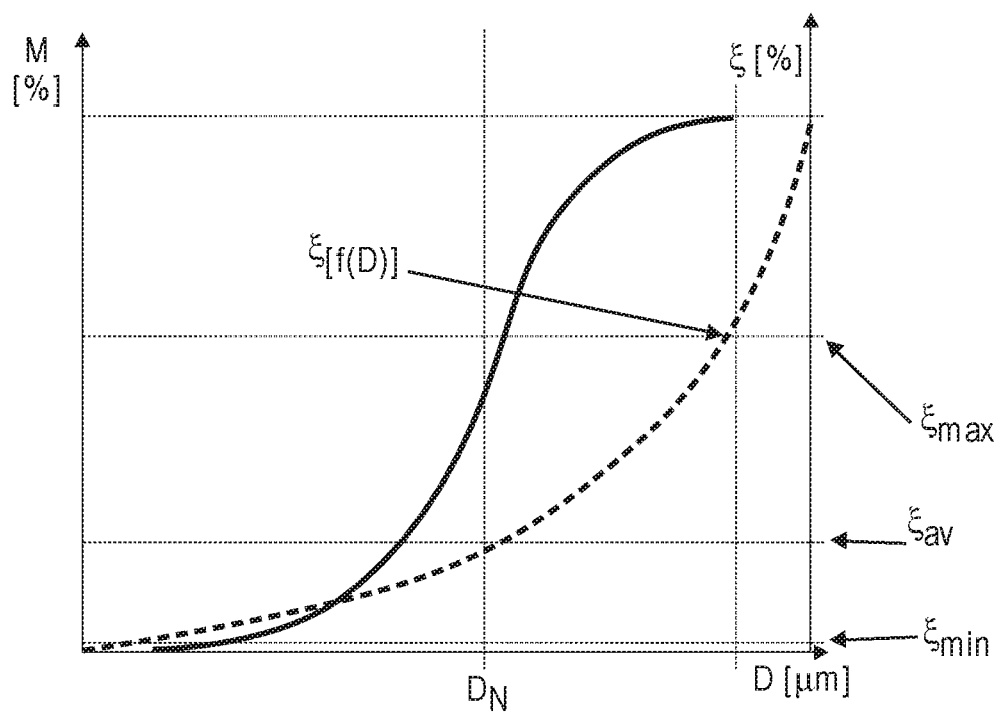
FIG. 9 shows a graph illustrating particle purity levels $\xi[f(D)]$ for constant leaching time as a function of particle diameter and varying initial contamination with the larger particle being higher contaminated.

For any chemical purification process based on a given constant leaching time, the worst case is represented by a combination of those factors where the product particle size is represented by a broader standard deviation, and under the condition that the larger particle originated from a raw material with higher initial impurity contamination (FIG. 9).

Thus, for a given chemical leaching treatment time, the achievable purity of the product can depend on the physical attributes of the product represented by:

the size and size distribution of the contained particles; and the initial contamination in/on these particles.

Therefore, for a given chemical leaching treatment time, the average purity of the product is higher, if:

the size and size distribution of the contained particles is small and narrow; and the initial contamination of these particles, and especially the large particles, is low.

For a given chemical leaching treatment time, the average purity of the product is lower, if:

the size and size distribution of the contained particles is large and wide; and the initial contamination of especially the large particles, is high.

The product purity after the final chemical leaching process is a function of the homogeneity of the particle contamination concentration over particle size as well as a function of the standard deviation. Therefore, the contamination of a particle can be calculated by sum of two components: (1) the integral of the contamination curve from surface to penetration depth or core; and (2) the area from gradient zero at the penetration depth to the core, and then dividing the sum by the radius to give a mean particle contamination.

Given an average concentration and fixed exposure to leaching, larger particles may have a greater proportion of contaminants at their core than smaller particles. Consequently, this leads to different particle size fractions containing different average purities and could have downstream implications for various technical applications.

Larger particles, with a greater radius, require the active leaching chemical to penetrate deeper into the structure, before the core has had sufficient chemical exposure to liberate or modify deleterious mineral species from the product.

The rate of penetration is not linear, but follows an exponential function as the surface is more readily accessible that the core. Additionally, chemical solution penetrating the particle loses efficiency as it is increasingly diluted due to the consumption of gangue minerals.

Assuming chemical leaching conditions of the following art: the graphite to be purified shall have a remaining average impurity of 0.01% (mass) after purification. The contaminated graphite particle has a spherical shape and is completely submerged in an active leaching solution. At some time of active exposure to the leaching agent, the contaminants at the particle surface will virtually be completely removed. Thus the remaining contamination at the surface of the particle represents 0% of the mass of the total particle. If the average mass contamination of the particle is to be 0.01%, according to target quality specification, then consequently the "relative" percentage of contamination at the core can be greater than the contamination mass average, i.e. 0.03% and the material still complies with target average purity requirements.

Considering the average contamination in a sample of spherical graphite, this method allows the extrapolation of contamination density with respect to the radius of an individual sphere.

Assuming a homogenous sphere, the averaged contamination of a plane intersecting the center of the sphere should be the same as the mass contamination of the sphere. Similarly, the average will be the same for a quarter plane comprising two orthogonal radii from the sphere. Hence, a section with coordinates x and y can be examined where x and y are perpendicular radii of the sphere.

Embodiments of the invention can use a particle contamination model that assumes a spherical natural graphite form and homogeneous internal structure, where contaminants bound thereof increase exponentially from the particle exterior to the core. The exponential function is determined by the average particle contamination, which is the integral of the function describing contamination percentage vs. the particle radius.

Average value of a function by integration.

$$y_{Av} = \frac{\int_0^r f(x)dx}{r-0} \text{ and,} \quad [1]$$

$$f(x) = a^x \quad [5]$$

$$\text{Therefore, } y_{Av} = \frac{\int_0^r a^x dx}{r} \quad [10]$$

Where, r is the radius of the spherical natural graphite particle, a is the base for exponent x and $y_{average}$ is the average particle contamination. The contamination limit is given by the pre-leaching average particle purity.

This model illustrates the desire for input homogeneity in optimizing leaching throughputs. If the particle size distribution is wide, then leaching rates can conform to the largest particles rather than the smaller particles within the distribution. Larger particles with greater radii can use increased leaching duration, and this allows for solvent penetration to reach the target depth, which corresponds to the purity target, as determined by the end user.

The homogeneity of particles may also differ with respect to blended natural graphite input fractions. Blending refers to the practice of mixing various ore concentrates, with variable parameters; contaminants, dimensions, size distributions, etc.

There is a downside to mixing various concentrates with one another. For example, the purification process is complicated by a heterogeneous and variable throughput. In the event of purifying such a blended mixture of natural graphite concentrates, it is desirable to scale leaching parameters to the worst case input fraction. This means that processes that process blended concentrate can allow for both the largest particles and the highest mean contaminations in any constituent of the blend.

Allowing for the largest particle sizes of the original concentrate is not an issue when the concentrates are fed through milling and tight classification prior to leaching.

The time, or throughput rate, penalty (in order to achieve a specified degree of purity) suffered by using blends of natural graphite concentrates can be determined by analyzing the variation in pre-blended concentrate contaminations.

Figure 10:
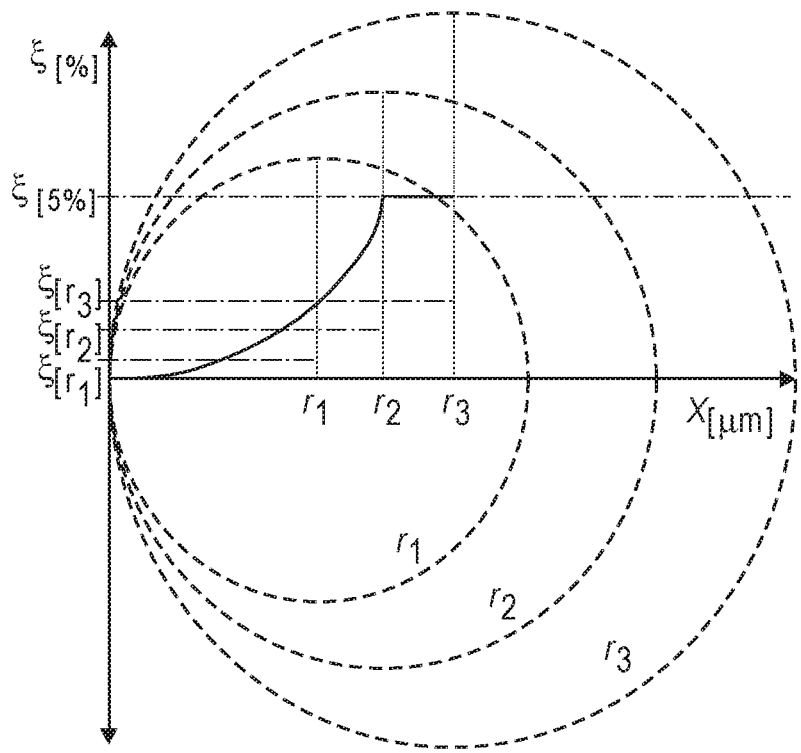
FIG. 10 shows a graph which illustrates differences in particle purity across particle sizes.

FIG. 10 illustrates how particle purity differs across particles of different sizes, given the same leaching exposure parameters. Note how $r_3$ contains significantly more contamination, at the core and on average, than smaller particles $r_1$ and $r_2$.

Figure 11:
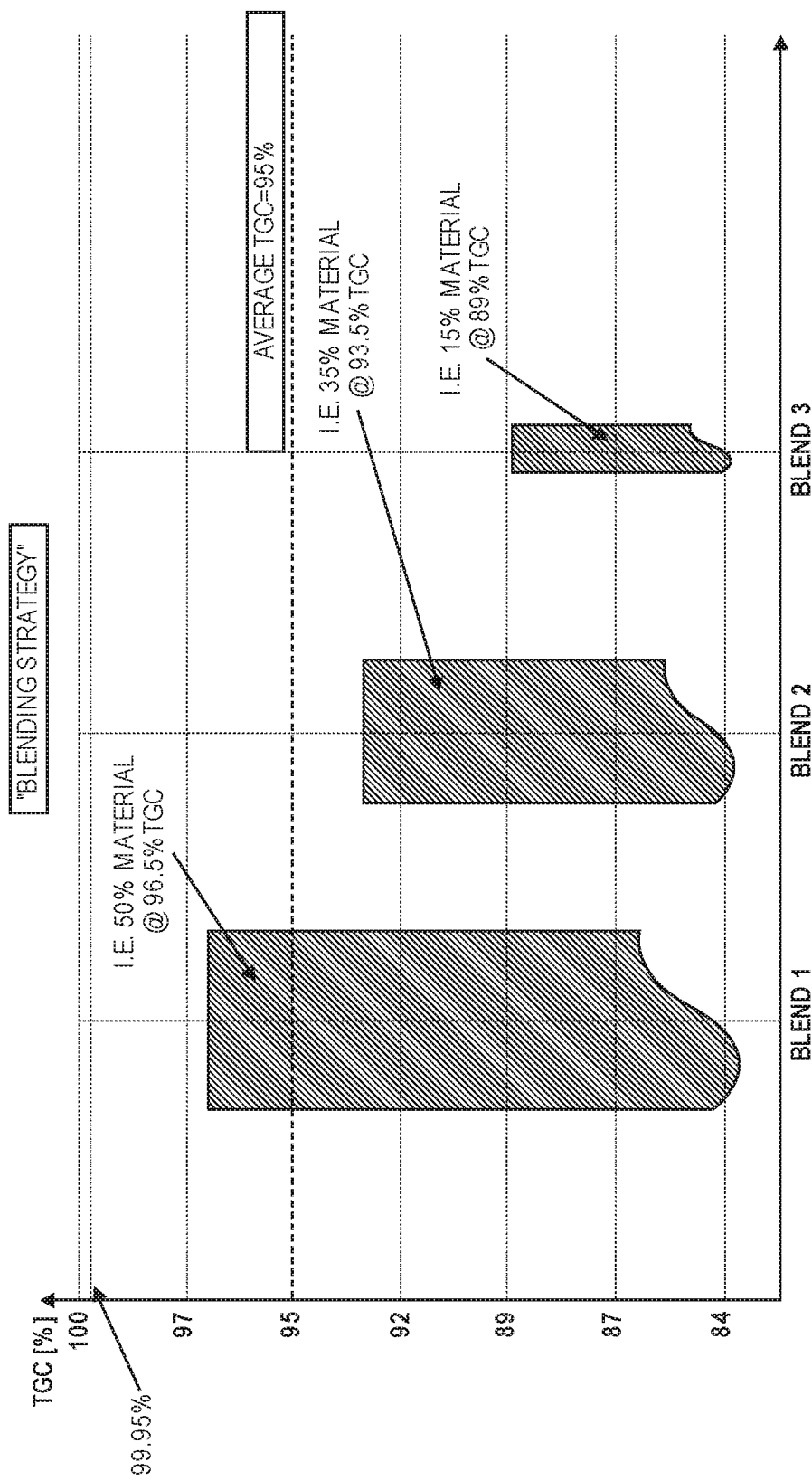
FIG. 11 shows a graph illustrating different product blends.

FIG. 11 shows an example of a specific "product blending strategy," where the average purity levels of the final product blend meet specification (i.e. 95% average purity). However, in this example, a larger proportion (blend 1) is made up of higher purity material (96.5%), a middle proportion (blend 2) is made of medium purity material (93.5%), and a smaller proportion (blend 3) contains a significantly larger amount of impurities (89% purity).

Figure 12:
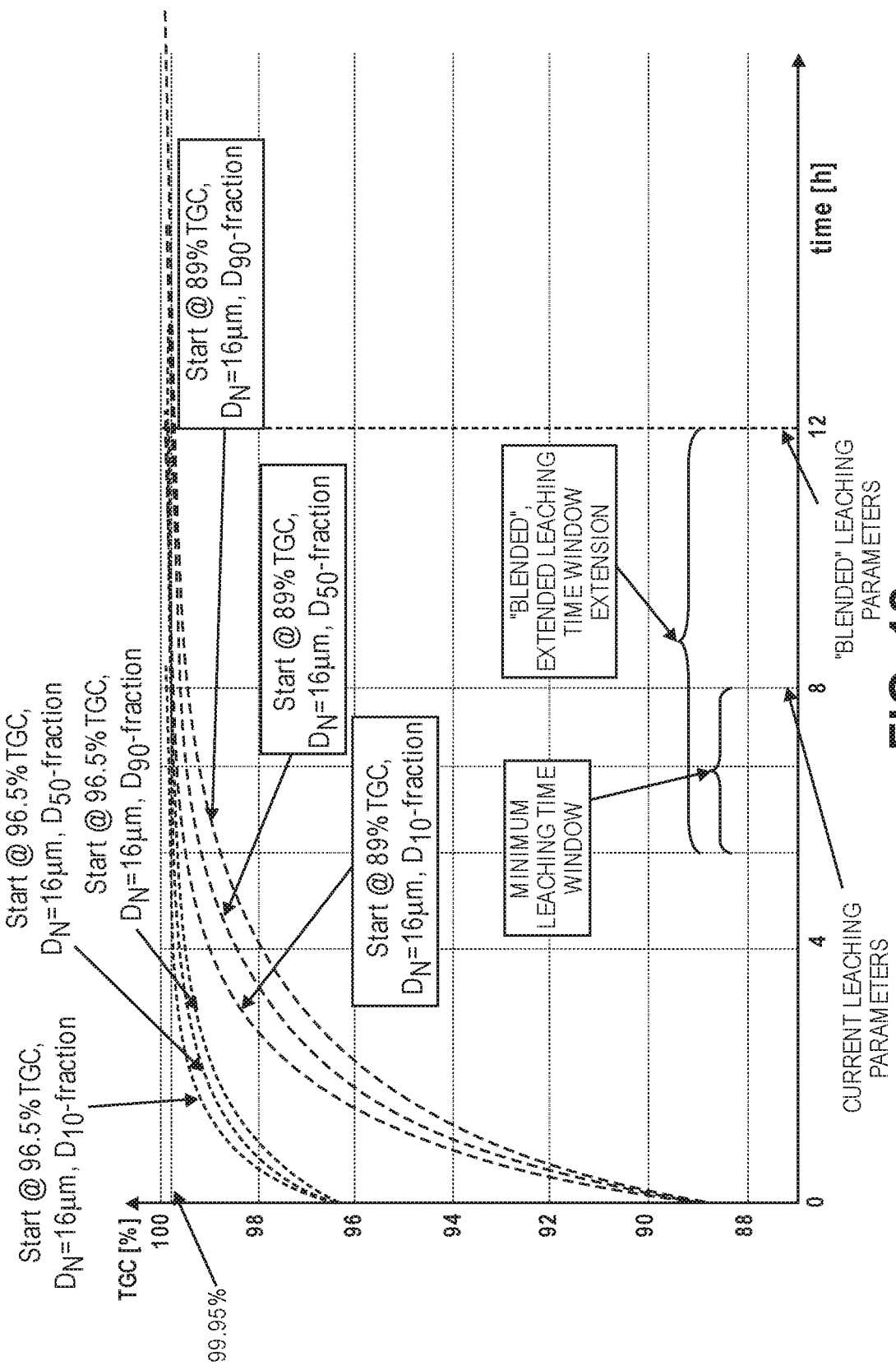
FIG. 12 shows a graph illustrating an impact on chemical purification processing time as a function of initial particle purity and particle size.

Such a raw material blend can introduce problems during processing and leaching, as shown in FIG. 12. As shown, the "blended" time window extension is needed to purify the particles with higher impurities, and as a result some particles in the blend may be overpurified.

Embodiments of the invention can solve these problems by defining optimal product particle size distributions, as well an innovative split process that will, in a first step, homogenize the individual particle contamination, which is the starting point for the second, final leaching step.

Figure 13:
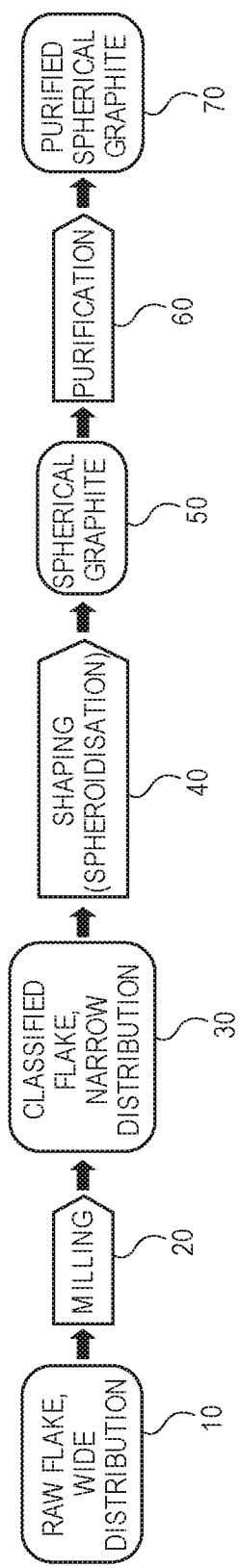
FIG. 13 shows a flow diagram of a conventional graphite particle purification process.

The classic and typical production process of battery grade spherical graphite is based on the steps shown in FIG. 13. In FIG. 13, raw graphite flakes with a wide size distribution may be used as a raw material 10. Then, the raw graphite flakes may be milled in a milling process 20. The graphite flakes may then be classified according to a narrow distribution 30. The graphite flakes are then shaped 40 to form spherical graphite particles 50. The spherical graphite particles are then purified using a chemical leaching process 60. The result of the purification process is purified spherical graphite 70.

Figure 14A:
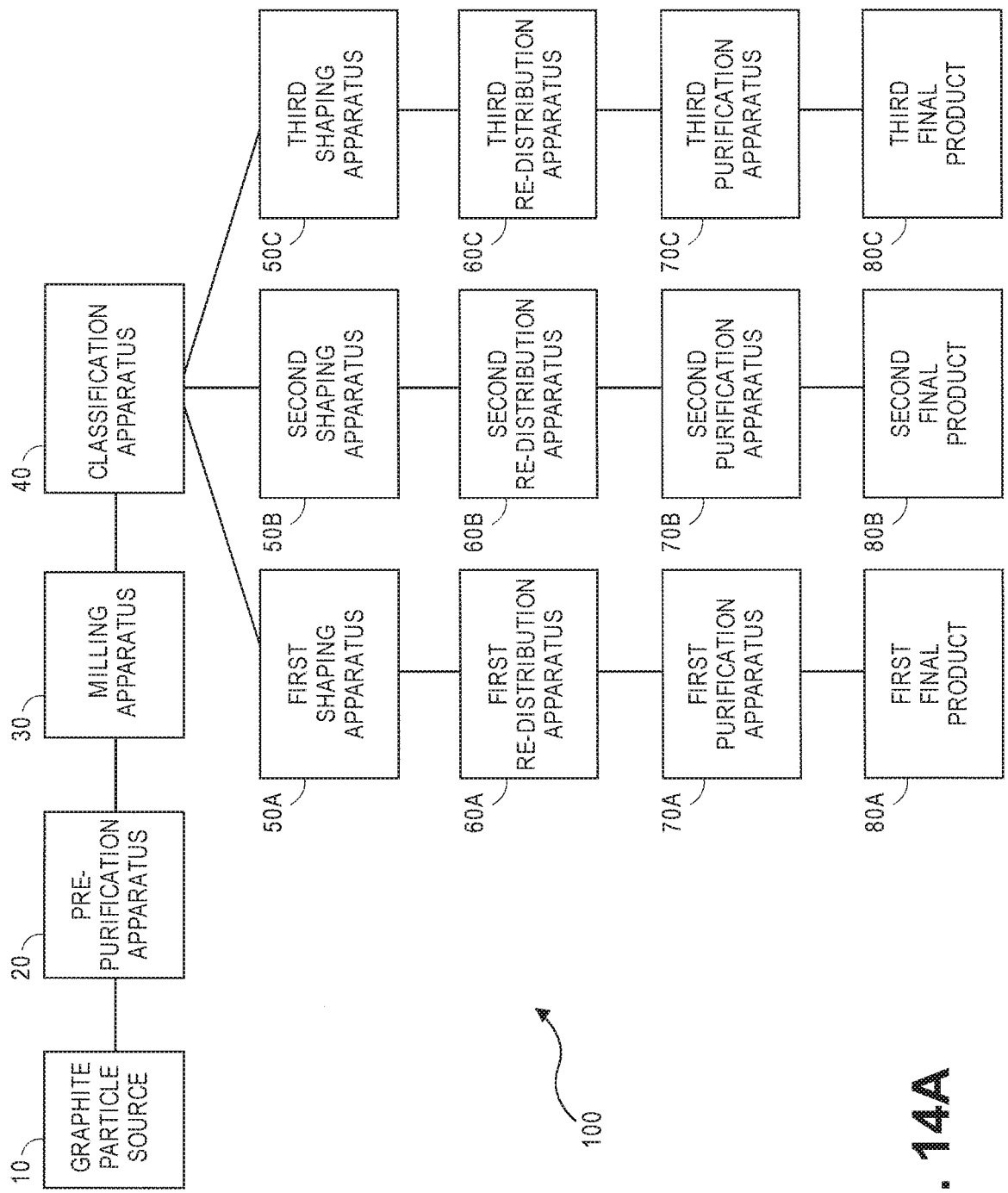
FIG. 14A shows a block diagram of a system according to an embodiment of the invention.

Embodiments of the invention can improve upon conventional processes, and can therefore include one or more of the following features:

introduce an optional additive pre-purification step that will even out any existing substantial differences in initial purity in between the individual particles of the feedstock pre-classify the milled material process the pre-classified feedstock in parallel production lines optimized for different product $D_N$ cut the larger particle size end of each product $D_N$ overlapping with the particle size distribution of the next larger $D_N$ product, and to optionally transfer this fraction into the next larger $D_N$ size product cut the larger particle size end of the largest product and to re-circulate this into the milling process individually and selectively chemically purify the different size distributions each with optimized leaching time parameters FIG. 14A shows a system 100 according to embodiments of the invention. The system 100 may include a graphite particle source 10 located upstream of a pre-purification apparatus 20. The pre-purification apparatus 20 may be located upstream of a milling apparatus 30 and a classification apparatus 40.

The graphite particle source 10 may comprise graphite particles in the form of graphite flakes. The graphite flakes may have any suitable sizes. For example, in some embodiments of the invention, the graphite flakes can have an average particle diameter of at most 50 micro meters (µm), preferably at most 200 micro meters microns.

The pre-purification apparatus 20 may include any suitable apparatus capable of purifying graphite flakes. The pre-purification apparatus 20 may utilize heat, purifying agents such as chemical agents, electromagnetic or acoustic energy, and/or mechanical agitation to purify the graphite flakes.

In some embodiments of the invention, the pre-purification apparatus may comprise a heat source. A heat source can heat the graphite to a high temperature (e.g., to 3,000 degree Celsius) so that embedded or attached impurities evaporate. The graphite flakes can be heated using other mechanisms including resistive heating as well as microwave or inductive heating.

In some embodiments of the invention, the pre-purification apparatus may comprise a combination of chemical and thermal purification processing such as that used in caustic baking. In caustic baking, the graphite particles are mixed with a caustic substance in a certain mass ratio, depending on the quality and quantity of graphite impurities, and then heated up to several hundred degrees Celsius using a heater, in order to facilitate chemical purification by means of a chemical reaction between the caustic substance and the impurities. This chemical reaction alters the chemical properties of the remaining impurities, which can be subsequently removed from the graphite by using aqueous rinsing or acidic leaching (e.g., with HCl, $H_2SO_4$ etc).

In some embodiments, the purification apparatus 20 may be in the form of a bath or fluidized bed with a caustic agent such as NaOH. In other embodiments, the pre-purification apparatus 20 may use microwaves or sound waves to help purify the graphite flakes. Exemplary purification apparatuses can be found in U.S. patent application Ser. No. 15/597,583, filed on Apr. 26, 2017, which is assigned to the same assignee as the present application, and is herein incorporated by reference, in its entirety.

The milling apparatus 30 may include an impact processor such as hammer mills, atomizer mills, jet mills, and pin mills. Some impact processors can be impact classifiers, which may both classify particles was well as impact them with an impactor. The milling apparatus 30 may function to break down the graphite flakes into smaller particles.

The classification apparatus 40 may include classifiers such as cyclonic air classifiers, inertial classifiers, and screen classifiers comprising screens for separating differently sized particles. Other systems for classifying particles according to sizes are described in U.S. patent application Ser. No. 15/596,948, filed on May 16, 2017, which is assigned to the same assignee as the present application, and which is herein incorporated by reference in its entirety for all purposes. As described therein, a milling apparatus such as an impact processor may be coupled to and in fluid communication with, in series, a first secondary classifier, a second secondary classifier, a third secondary classifier, and a dust collector. The dust collector is furthest downstream from the impact processor. The impact processor may be a classifier impact processor in some embodiments of the invention. Particles of a first nominal size may be output by the first secondary classifier, particles of a second nominal size may be output by the second secondary classifier, and particles of a third nominal size may be output by the third secondary classifier. The first nominal size is larger than the second nominal size, and the second nominal size is larger than the third nominal size. While embodiments of the invention may process groups of particles with any number of nominal sizes, in some embodiments, there are no more than four groups with four nominal sizes that are produced.

The classification apparatus 40 may supply groups (e.g., streams or batches) of graphite particles with different nominal sizes to a plurality of shaping apparatuses. In this example, a first shaping apparatus 50A, a second shaping apparatus 50B, and a third shaping apparatus 50C are shown. It is understood that there may be more or less shaping apparatuses in other embodiments of the invention.

The first, second, and third shaping apparatuses 50A, 50B, 50C may include impact processor such as hammer mills, jet mills, and pin mills, or even classifiers such as cyclonic air classifiers and inertial classifiers. Shaping can occur when the graphite particles are mechanically impacted to remove rough edges and to form the graphite particles into spheres.

The first, second, and third shaping apparatuses 50A, 50B, 50C may feed particle groups (e.g., batches or streams) into first, second, and third re-distribution apparatuses 60A, 60B, 60C. As will be explained in further detail below, a portion of a group of graphite particles having a particular nominal diameter and a first distribution may be separated from the remaining portion of the group, and then transferred to another group of graphite particles having another nominal diameter and a second distribution. The redistribution of the graphite particles between groups helps to ensure that purification processing for each particular group of particles is optimized.

The first, second, and third re-distribution apparatuses 60A, 60B, 60C may include screen classifiers, or other types of classifiers, which can separate particles within groups of particles. A portion of the particles in a group of particles having a nominal diameter and a distribution may be separated using a screen classifier, and then re-distributed to another group of particles with a different nominal size and distribution.

The first, second, and third re-distribution apparatuses 60A, 60B, 60C may then provide re-distributed particle batches or streams to respective first, second, and third purification apparatuses 70A, 70B, 70C. The first, second, and third purification apparatuses 70A, 70B, 70C may produces first, second, and third final products (i.e., batches of purified graphite particles) 80A, 80B, 80C.

The first, second, and third purification apparatuses 70A, 70B, 70C may be of the same type or different than the pre-purification apparatus 20 described above. In some embodiments, the equipment used in the first, second, and third purification apparatuses 70A, 70B, 70C may be generally the same (e.g., all heated reaction beds with caustic agents), but the processing parameters may be different in each of the first, second, and third purification apparatuses 70A, 70B, 70C, since they are processing particles groups with different nominal sizes. For example, if the first purification apparatus 70A processes graphite particles with a larger nominal diameter than the third purification apparatus 70C, then the graphite particles in the first purification apparatus 70A may have a longer reaction time with the caustic material than the graphite particles in the third purification apparatus 70C.

Figure 14B:
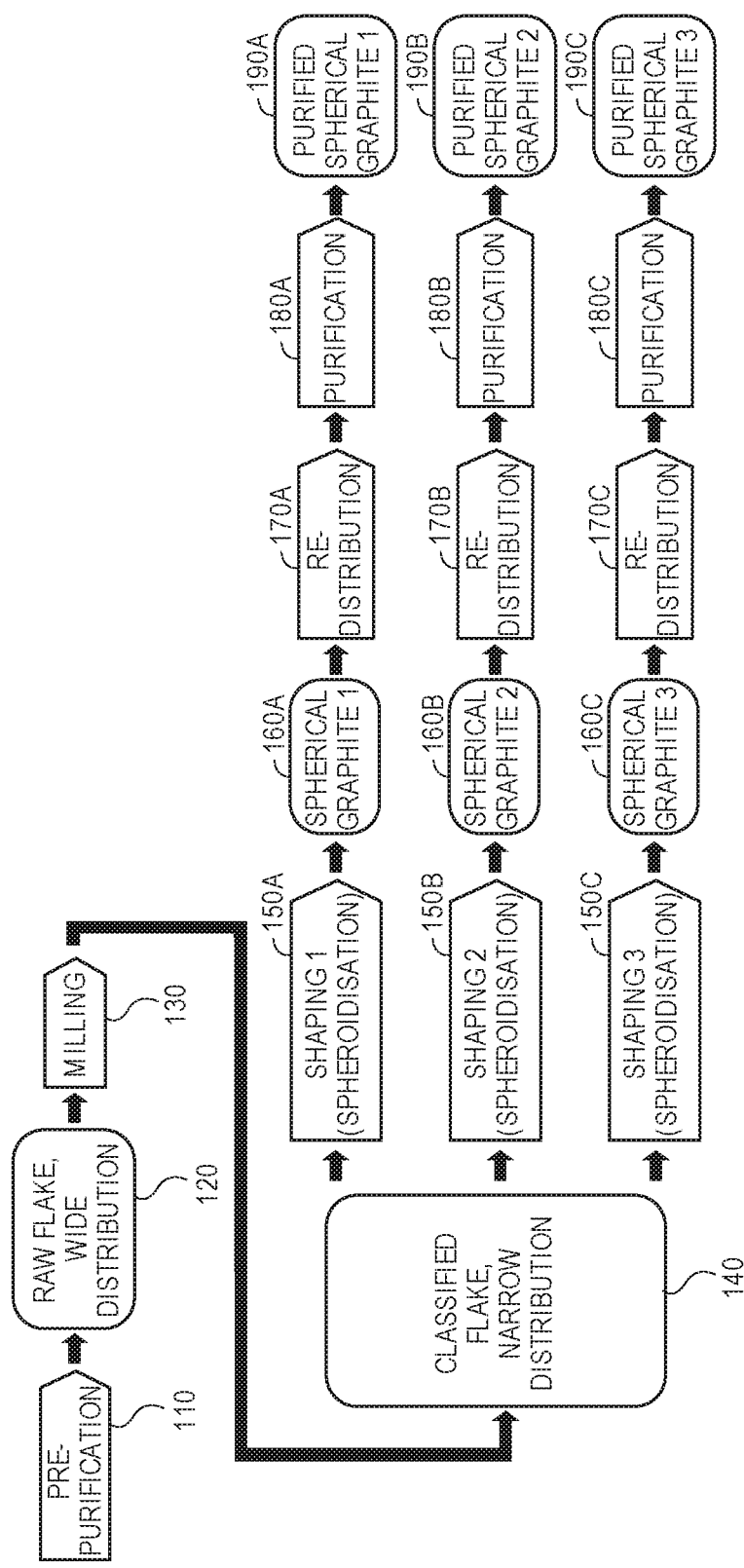
FIG. 14B shows a flow diagram illustrating methods according to embodiments of the invention.

Embodiments of the invention can be described with reference to the process flow illustrated in FIG. 14B, with reference to FIG. 14A.

Graphite flakes from a graphite particle source 10 may be fed to a pre-purification apparatus 20. The pre-purification apparatus 20 may perform a pre-purification process 110 on the graphite flakes. This pre-purification step can utilize different physical purification mechanism than the final purification process. For example, if the final purification process is based on an aqueous acidic process, the pre-purification process can utilize caustic baking or some other mechanism. In this step, the graphite flakes are pre-purified according to a pre-determined process in order to increase their average level of purity in order to be optimized suitable (pre-conditioned) for the process parameters of the final purification process. After the pre-purification process 110, the graphite flakes can have a wide distribution. Also, in some embodiments, the graphite flakes can have an average particle diameter of at most 50 micro meters, preferably at most 200 microns.

After the pre-purification process 110, the purified graphite flakes can be introduced to a milling apparatus 30. In the milling apparatus 30, a milling process 130 can occur. The milling process 30 can form smaller graphite particles that will have a wide range of sizes.

In classification process 140, different groups of graphite particles with different nominal sizes and different size distributions may be created in a classification apparatus 40. These groups of particles may be denoted by "Shaping 1" 150A, "Shaping 2" 150B, and "Shaping 3" 150C in FIG. 14B. In "Shaping 1" 150A, "Shaping 2" 150B, and "Shaping 3" 150C, the various groups of flakes can undergo spheroidisation in respective first, second, and third shaping apparatuses 50A, 50B, 50C. In the first, second, and third shaping apparatuses 50A, 50B, 50C, the flakes are formed into spherical particles. The groups of shaped flakes can be denoted by "Spherical Graphite 1" 160A, Spherical Graphite 2" 160B, and "Spherical Graphite 3" 160C in FIG. 14B. As noted above, some details on classification and milling processes can be found in U.S. patent application Ser. No. 15/596,948, filed on May 16, 2017, and U.S. Provisional Patent Application No. 62/338,046, filed on May 18, 2016, which is herein incorporated by reference in its entirety for all purposes.

In some embodiments, classifying comprises selectively separating the graphite particles with a nominal particle diameter $D_N$, that exceeds a size ratio of $D_N:D_{max}=1:2$ to 1:4.

Figure 15:
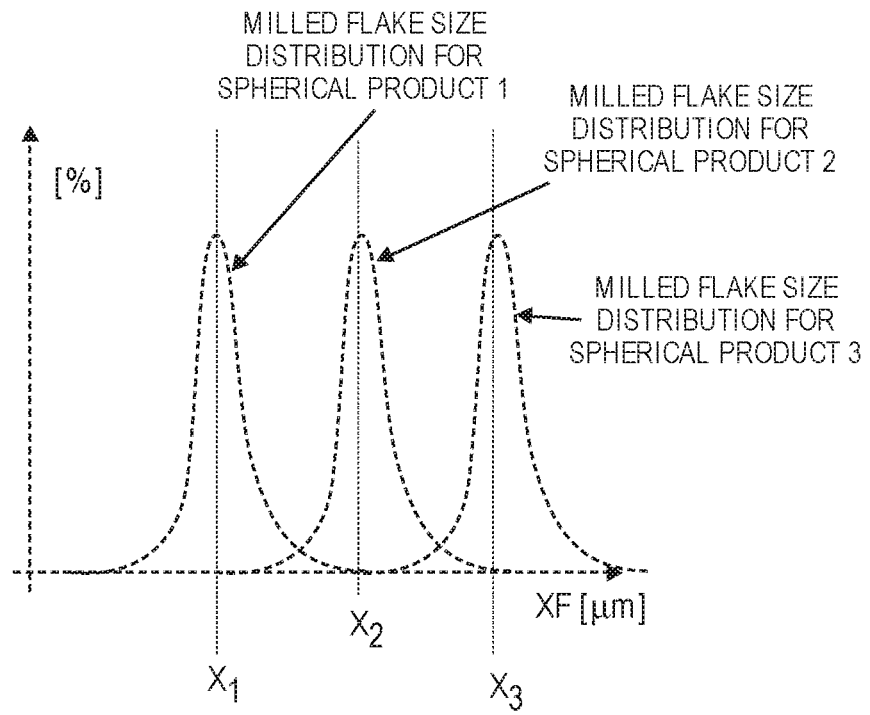
FIG. 15 shows a graph illustrating particle size distributions for three different sizes of graphite particles.

FIG. 15 shows a graph with three different groups of graphite particles (i.e., Product 1, Product 2, Product 3), each group having a different nominal diameter $X_1$, $X_2$, or $X_3$. As is shown in FIG. 15, the upper and lower ends of the distributions of adjacent particles groups can overlap.

In steps 170A, 170B, 170C, particles within the groupings may then be subjected to re-distribution in first, second, and third re-distribution apparatuses 60A, 60B, 60C so that the specific particle groupings can have even more narrowly defined particle distributions.

Figure 16:
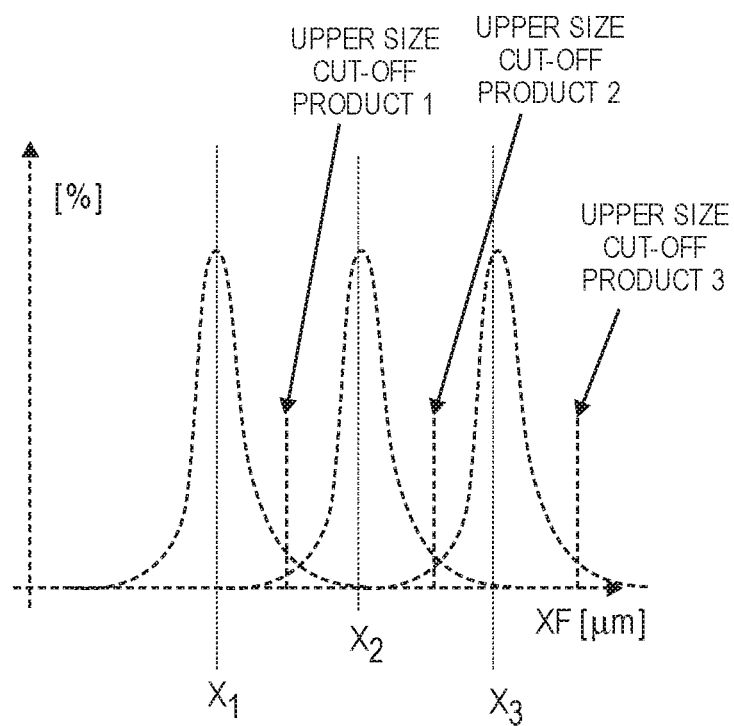
FIG. 16 shows a graph illustrating particle size distributions for three different sizes of graphite particles, with cut-offs.
Figure 17:
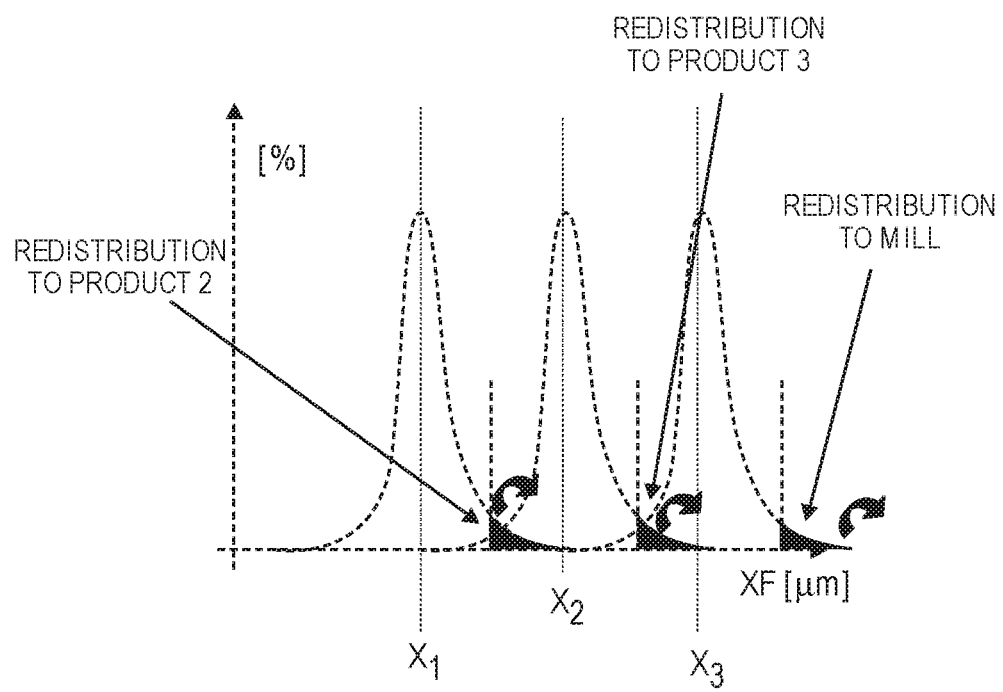
FIG. 17 shows a graph illustrating particle size distributions for three different sizes of graphite particles.

As shown in FIG. 16, an upper size cut-off may be defined for the different groups of particles, designated by Product 1, Product 2, and Product 3. As shown in FIG. 17, a portion of the particles in each group above the upper-size cut off may be separated from that group, and then may be transferred to the group of particles with the next larger nominal size.

The benefit of doing this is that processing parameters that are used in the purification process can be optimized such that substantially all of the particles within a group are highly pure. That is, as explained previously, processing parameters for purification processes may be optimized for particles having a particular nominal diameter. However, such parameters may be insufficient to purify a particle that is somewhat larger than the nominal diameter. By having an upper size cut off, larger particles in one size distribution may be processed more efficiently with another group of particles with a larger nominal diameter.

After the groups of particles are re-distributed to form more narrowly defined particle distributions, each group of particles may be subjected to different purification processes (as described above) 180A, 180B, 180C in first second, and third purification apparatuses 70A, 70B, 70C, that may be optimized for the different size distributions being processed.

The purification processes may be different for the different groups of particles, since they have respectively different nominal sizes. For example, the smaller particles may be processed in manner such that they spend less time in a purifying material than larger particles. In another embodiment, smaller particles may be processed such that less heat and/or agitation is applied during purification processing, as compared to processing larger particles. In yet other embodiments, a stronger chemical agent may be applied to larger particles than smaller particles during their respective purification processes. Then, the end products can be purified groups of graphite particles with narrow size range distributions.

In some embodiments, redistributing separated oversized particles with $D > D_N$ as follows: (a) a first oversized cut-off of the first group of particles with a nominal diameter $D_{N1}$, where $D_1 > D_{1max}$, is added to a second group of particles with a nominal diameter $D_{N2}$, where $D_{N2} > D_{N1}$; and (b) a second oversized cut-off of the second group of particles with a nominal diameter $D_{N2}$ where $D_2 > D_{2max}$, is added to the third product powder with $D_{N3} > D_{N1}$, and so forth.

In some embodiments, redistribution of the separated oversized particles with $D > D_N$ as follows: (a) the oversized cut-off of the first product powder with the nominal diameter $D_{N1}$ which is $D_1 > D_{1max}$, is added to the second product powder with $D_{N2} > D_{N1}$; and (b) the oversized cut-off of the last product powder with the largest nominal diameter $D_{NL}$ which is $D_L > D_{Lmax}$, is re-circulated back into the milling and/or pre-classification processes.

Exemplary purification processes are described above, and may include a chemical leaching process, a wash, a bath with physical agitation, a system with a pressure gradient, an induced and controlled thermal gradient, and/or ultrasonic purification processes.

Figure 18:
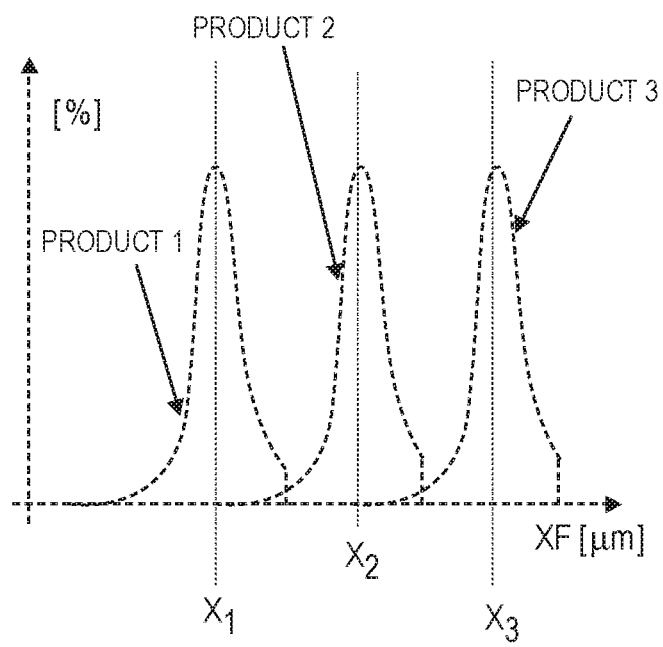
FIG. 18 shows a graph illustrating particle size distributions for three different sizes of graphite particles.

The different groups of graphite particles denoted by Product 1, Product 2, and Product 3 have distributions as illustrated in FIG. 18. Each of the purified groups of graphite particles can comprise a mixed size fraction distribution, characterized by a nominal diameter $D_N$, a lower 10% (mass) cut-off diameter $D_{10}$, and an upper 10% (mass) cut-off diameter $D_{90}$, whereby the range of the ratio of $D_{10}:D_N$ is about 1:4 to about 1:2, and the range of the ratio of $D_N:D_{90}$ is about 1:1.3 to about 1:3. In other embodiments, each of the purified groups of graphite particles can comprise a mixed size fraction distribution, characterized by a nominal diameter $D_N$, a lower 10% (mass) cut-off diameter $D_{10}$, and an upper absolute cut-off diameter $D_{max}$, whereby the range of the ratio of $D_{10}:D_N$ is about 1:3 to about 1:1.3, and the range of the ratio of $D_N:D_{max}$ is about 1:1.3 to about 1:3, whereby $D_{max} > 99\%$ by mass of (mass) of the group of graphite particles.

After being processed by the first, second, and third purification apparatuses 70A, 70B, 70C, the groups of graphite particles with different nominal diameters are highly purified and can be used battery anodes in lithium ion batteries.

The purified graphite particles may each comprise gradually zoned gangue contamination, comprising an exponential gradient in contamination concentration from low values at the particle surface to higher values at the center of the particle, wherein each purified graphite particle comprises an average particle contamination of X %, where X is in the range of 0.02%-0.2%, and a difference ΔX % between zoned contamination concentration at the particle surface $X_S$% and at the center of the core $X_C$% not greater than $0.1\%_{(absolute)}$.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   milling graphite flakes to form graphite particles of varying sizes;
   classifying the graphite particles into different groups of graphite particles with respectively different nominal sizes; and
   performing different purification processes on the different groups of graphite particles with respectively different nominal sizes to produce purified groups of graphite particles, wherein the different groups of graphite particles comprise a first group of graphite particles of a first nominal size and a second group of graphite particles with a second nominal size, wherein the first nominal size is less than the second nominal size, and wherein the first group of graphite particles is exposed to a purifying agent for less time than the second group of graphite particles is exposed to the purifying agent.

2. The method of claim 1, wherein the graphite flakes are purified graphite flakes, and wherein the method further comprises
   pre-purifying graphite flakes from a graphite particle source using a pre-purification process.

3. The method of claim 1, wherein the different purification processes include a chemical leaching process, a wash, a bath with physical agitation, a system with a pressure gradient, and/or ultrasonic purification processes.

4. A method comprising:
   milling graphite flakes to form graphite particles of varying sizes;
   classifying the graphite particles into different groups of graphite particles with respectively different nominal sizes; and
   performing different purification processes on the different groups of graphite particles with respectively different nominal sizes to produce purified groups of graphite particles, wherein the purified graphite particles in the purified groups of graphite particles each comprise gradually zoned gangue contamination, comprising an exponential gradient in contamination concentration from low values at a particle surface to higher values at a center of the particle, wherein each purified graphite particle comprises an average particle contamination of X %, where X is in a range of 0.02%-0.2%, and a difference $\Delta X$ % between zoned contamination concentration at a particle surface $X_S$ % and at a center of a core $X_C$ % not greater than 0.1% (absolute).

5. The method of claim 4, wherein the different purification processes respectively comprise exposing the different groups of graphite particles to a purifying agent for different amounts of time.

6. A method comprising:
   milling graphite flakes to form graphite particles of varying sizes;
   classifying the graphite particles into different groups of graphite particles with respectively different nominal sizes; and
   performing different purification processes on the different groups of graphite particles with respectively different nominal sizes to produce purified groups of graphite particles, wherein the purified groups of graphite particles each comprise a mixed size fraction distribution, characterized by a nominal diameter $D_N$, a lower 10% (mass) cut-off diameter $D_{10}$, and an upper 10% (mass) cut-off diameter $D_{90}$, whereby a range of a ratio of $D_{10}:D_N$ is about 1:3 to about 1:1.3, and the range of a ratio of $D_N:D_{90}$ is about 1:1.3 to about 1:3.

7. A method comprising:
   milling graphite flakes to form graphite particles of varying sizes;
   classifying the graphite particles into different groups of graphite particles with respectively different nominal sizes; and
   performing different purification processes on the different groups of graphite particles with respectively different nominal sizes to produce purified groups of graphite particles, wherein each of the purified groups of graphite particles comprises a mixed size fraction distribution, characterized by a nominal diameter $D_N$, a lower 10% (mass) cut-off diameter $D_{10}$, and an upper absolute cut-off diameter $D_{max}$, whereby a range of a ratio of $D_{10}:D_N$ is about 1:3 to about 1:1.3, and a range of the ratio of $D_N:D_{max}$ is about 1:1.3 to about 1:3, whereby $D_{max}$>99% by mass of (mass) of the group of graphite particles.

8. A method comprising:
   milling graphite flakes to form graphite particles of varying sizes;
   classifying the graphite particles into different groups of graphite particles with respectively different nominal sizes; and
   performing different purification processes on the different groups of graphite particles with respectively different nominal sizes to produce purified groups of graphite particles, wherein the graphite flakes are purified graphite flakes, and wherein the method further comprises:
   pre-purifying graphite flakes from a graphite particle source using a pre-purification process comprising a chemical agent, and wherein the different nominal sizes comprise at most four different nominal sizes.

9. A method comprising:
   milling graphite flakes to form graphite particles of varying sizes;
   classifying the graphite particles into different groups of graphite particles with respectively different nominal sizes; and
   performing different purification processes on the different groups of graphite particles with respectively different nominal sizes to produce purified groups of graphite particles, wherein classifying comprises selectively separating the graphite particles into groups with distributions that can have a nominal particle diameter $D_N$, with $D_N:D_{max}$=1:1.3 to 1:3, where $D_{max}$ is an upper absolute cut-off diameter.

10. The method of claim 1, A method comprising:
    milling graphite flakes to form graphite particles of varying sizes;
    classifying the graphite particles into different groups of graphite particles with respectively different nominal sizes; and
    performing different purification processes on the different groups of graphite particles with respectively different nominal sizes to produce purified groups of graphite particles, the method further comprising:

redistributing separated oversized particles with $D>D_N$ as follows:
(a) a first oversized cut-off of a first group of particles with a nominal diameter $D_{N1}$ in the first group of particles, where $D_1>D_{1max}$, is added to a second group of particles with a nominal diameter $D_{N2}$ in the group of particles, where $D_{N2}>D_{N1}$; and
(b) a second oversized cut-off of the second group of particles with a nominal diameter $D_{N2}$ where $D_2>D_{2max}$, is added to a third group of particles with $D_{N3}>D_{N1}$, and so forth.

11. The method of claim 10, further comprising:

redistribution of the separated oversized particles with $D>D_N$ as follows:
(a) the first oversized cut-off of the first group of particles with the nominal diameter $D_{N1}$ which is $D_1>D_{1max}$, is added to the second group of particles with $D_{N2}>D_{N1}$; and
(b) the oversized cut-off of a group of particles with the largest nominal diameter $D_{NL}$ which is $D_L>D_{Lmax}$, is re-circulated back into the milling and classification process.

12. A system comprising:

a milling apparatus for milling graphite flakes into graphite particles;

a classification apparatus coupled to the milling apparatus for classifying the graphite particles into different particle groups with different nominal sizes;

a plurality of shaping apparatuses for shaping the graphite particles in the different particle groups; and a plurality of purification apparatuses respectively coupled to the plurality of shaping apparatuses.

13. The system of claim 12, further comprising a pre-purification apparatus upstream of the milling apparatus for purifying the graphite flakes before they enter the milling apparatus.

14. The system of claim 12 further comprising:

a plurality of re-distribution apparatuses for re-distributing particles within a particle group to another particle group.

15. The system of claim 12, further comprising a graphite particle source upstream of the milling apparatus.

16. The system of claim 12, wherein each purification apparatus comprises a caustic agent.

17. The system of claim 12, further comprising:

a plurality of re-distribution apparatuses, wherein the plurality of re-distribution apparatuses comprise screens.

18. The system of claim 12, wherein the plurality of shaping apparatuses comprise cyclone classifiers or impact processors.

19. The system of claim 12, wherein each purification apparatus comprises a heater.

* * * * *

UNITED STATES PATENT AND TRADEMARK OFFICE
CERTIFICATE OF CORRECTION

PATENT NO. : 10,710,882 B2
APPLICATION NO. : 15/631856
DATED : July 14, 2020
INVENTOR(S) : Jens Berkan et al.

Page 1 of 1

It is certified that error appears in the above-identified patent and that said Letters Patent is hereby corrected as shown below:

In the Claims

In Column 14, Line 60, please remove "The method of claim 1,"

Signed and Sealed this
Tenth Day of November, 2020

Andrei Iancu
*Director of the United States Patent and Trademark Office*